United States Patent
Bealkowski et al.

(10) Patent No.: US 8,719,560 B2
(45) Date of Patent: May 6, 2014

(54) VIRTUAL MACHINE MONITOR BRIDGE TO BARE-METAL BOOTING

(75) Inventors: Richard Bealkowski, Redmond, WA (US); Michael R. Turner, Carnation, WA (US)

(73) Assignee: International Business Machines Corporation, Armonk, NY (US)

( * ) Notice: Subject to any disclaimer, the term of this patent is extended or adjusted under 35 U.S.C. 154(b) by 210 days.

(21) Appl. No.: 13/324,598

(22) Filed: Dec. 13, 2011

(65) Prior Publication Data

US 2013/0151831 A1 Jun. 13, 2013

(51) Int. Cl.
*G06F 9/455* (2006.01)
*G06F 9/00* (2006.01)
*G06F 1/00* (2006.01)

(52) U.S. Cl.
USPC ............ 713/2; 713/1; 713/100; 718/1

(58) Field of Classification Search
USPC ...................... 713/1, 2, 100; 718/1
See application file for complete search history.

(56) References Cited

U.S. PATENT DOCUMENTS

| | | | |
|---|---|---|---|
| 7,779,305 B2 * | 8/2010 | Zimmer et al. | 714/38.13 |
| 8,522,236 B2 * | 8/2013 | Zimmer et al. | 718/1 |
| 8,595,723 B2 * | 11/2013 | Garrett et al. | 718/1 |
| 2009/0172661 A1 | 7/2009 | Zimmer et al. | |
| 2009/0204964 A1 * | 8/2009 | Foley et al. | 718/1 |
| 2009/0282284 A1 | 11/2009 | Naohiro et al. | |
| 2009/0287571 A1 * | 11/2009 | Fujioka | 705/14.54 |
| 2010/0161922 A1 | 6/2010 | Sharp et al. | |
| 2010/0235831 A1 * | 9/2010 | Dittmer | 718/1 |
| 2010/0306774 A1 | 12/2010 | Kalbarga | |
| 2011/0145591 A1 * | 6/2011 | Grzybowski | 713/189 |
| 2011/0145916 A1 | 6/2011 | McKenzie et al. | |
| 2011/0167473 A1 | 7/2011 | Evans et al. | |

FOREIGN PATENT DOCUMENTS

| | | |
|---|---|---|
| CN | 101425046 A | 5/2009 |
| DE | 202010005486 U1 | 9/2010 |
| JP | 2009222527 | 10/2009 |

OTHER PUBLICATIONS

International Search Report and Written Opinion dated Feb. 28, 2013 for International Application No. PCT/CN2012/085035, 10 pages.

(Continued)

*Primary Examiner* — M Elamin
(74) *Attorney, Agent, or Firm* — Stephen J. Walder, Jr.; Thomas E. Tyson

(57) ABSTRACT

Mechanisms for executing a bare metal boot operation for bare metal booting a control program are provided. These mechanisms boot a computing device to a hypervisor ownership phase of the bare metal boot operation. During the hypervisor ownership phase of the bare metal boot operation a hypervisor is loaded and controls and manages platform hardware of the computing device. The computing device is then booted from the hypervisor ownership phase to a transition phase in which the hypervisor releases control and management of the platform hardware of the computing device to the control program. The computing device is then booted from the transition phase to a control program ownership phase in which the control program is in full control and manages the platform hardware. The bare metal boot operation is performed without restarting the computing device and without cycling through initialization of firmware.

25 Claims, 6 Drawing Sheets

(56) References Cited

OTHER PUBLICATIONS

"Hot-Add Memory Support in Windows Server", http://www.microsoft.com/whdc/system/pnppwr/hotadd/hotaddmem.mspx, updated Oct. 28, 2010, accessed on Dec. 12, 2011, 5 pages.

"Mechanisms to determine if software is running in a VMware virtual machine", http://kb.vmware.com/selfservice/microsites/search.do?language=en_US&cmd=displayKC&externalId=1009458, updated Mar. 18, 2011, accessed on Nov. 26, 2011, 5 pages.

Kinzhalin, Arzhan et al., "Enabling dynamic data centers with a smart bare-metal server platform", Cluster Comput (2011) 14:245-258, DOI 10.1007/s10586-010-0125-8, Feb. 2010, pp. 245-258.

* cited by examiner

VIRTUAL MACHINE MONITOR BRIDGE TO BARE-METAL BOOTING

BACKGROUND

The present application relates generally to an improved data processing apparatus and method and more specifically to mechanisms for providing a virtual machine monitor bridge to bare-metal booting.

A hypervisor, also referred to as a virtual machine monitor (VMM), allows multiple operating systems to run concurrently on a host system, such as a host computer or server providing computing services to host systems. Such a feature is often referred to as hardware virtualization. The hypervisor may present guest operating systems with a virtual platform and may monitor the execution of the guest operating system. In this way, multiple operating systems, including multiple instances of the same operating system, can share hardware resources of a data processing system, either a stand-alone data processing system or distributed data processing system.

Hypervisors are generally classified as being either Type 1 or Type 2. A Type 1 hypervisor (or native, bare metal hypervisor) runs directly on the host's hardware for controlling the hardware and for monitoring guest operating systems. A guest operating system thus runs on another operating system environment, with the hypervisor layer as a distinct second software level, and the guest operating systems running at another level above the hardware.

SUMMARY

In one illustrative embodiment, a method, in a computing device, for executing a bare metal boot operation for bare metal booting a control program. The method comprises booting the computing device to a hypervisor ownership phase of the bare metal boot operation. During the hypervisor ownership phase of the bare metal boot operation a hypervisor is loaded and controls and manages platform hardware of the computing device. The method further comprises booting the computing device, from the hypervisor ownership phase of the bare metal boot operation, to a transition phase of the bare metal boot operation in which the hypervisor releases control and management of the platform hardware of the computing device to the control program. Moreover, the method comprises booting the computing device from the transition phase to a control program ownership phase of the bare metal boot operation in which the control program is in full control and manages the platform hardware. Furthermore, the bare metal boot operation is performed without a software restart or power cycling of the computing device.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
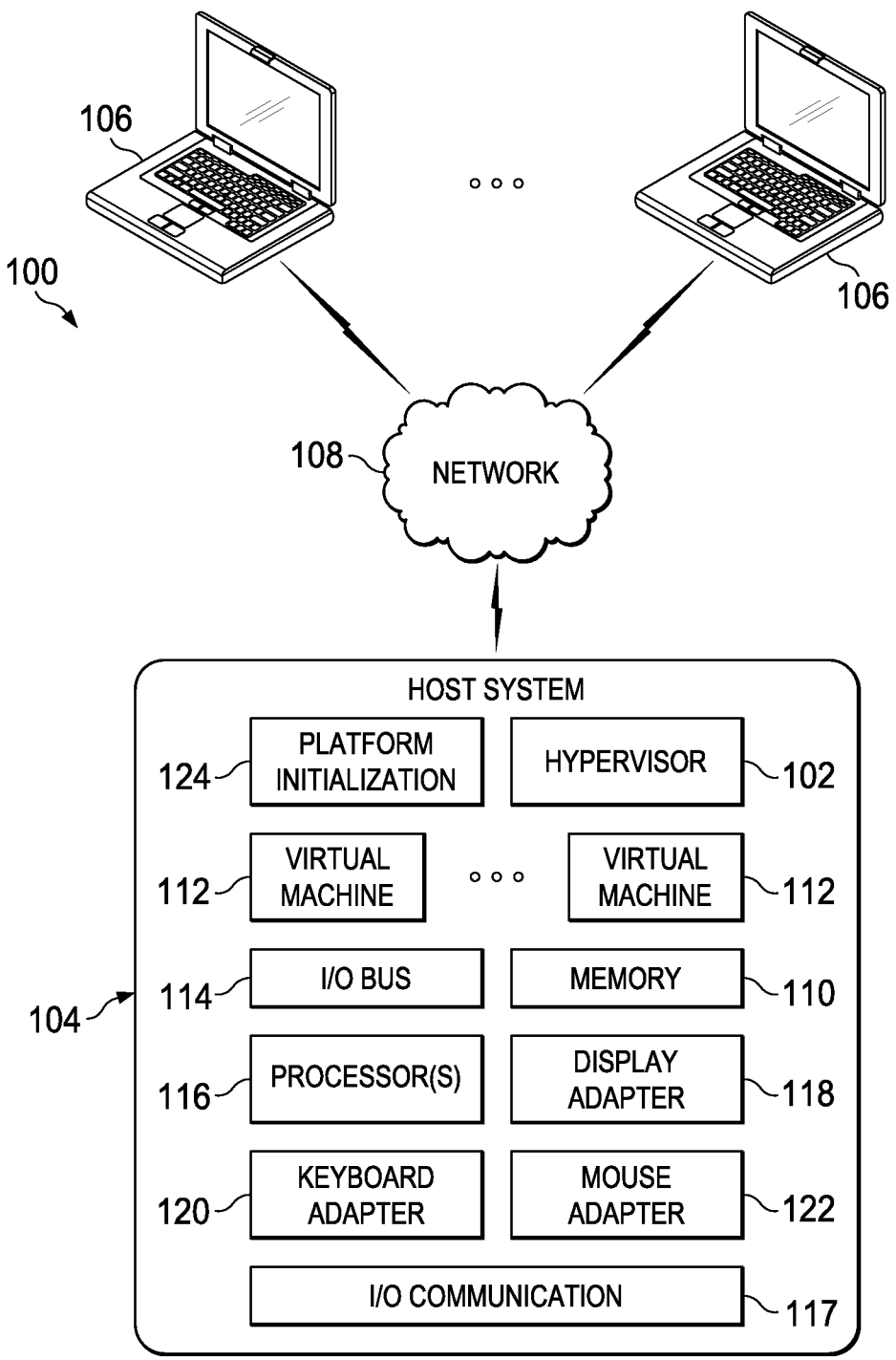
FIG. 1 illustrates a block diagram of a system for enabling a hypervisor to efficiently assume control in a cloud computing environment in accordance with embodiments of the present invention.

During a boot up operation of a computer system, the computer system may power up and initialize itself and then boot up a control program, such as an operating system or a hypervisor. The initial booting of a Type 1 hypervisor is a "bare metal" boot since the hypervisor is in direct control of the hardware platform. The term "bare metal" refers to the hypervisor not having to go through another layer of software to access the underlying hardware resources. A "non-bare metal" boot of code means that the code must communicate with another layer of software that is logically present between the code and the underlying hardware resources. The booting of guest operating systems, i.e. virtual machines, is a "non-bare metal" virtual boot process since the guest operating systems are booting on top of the Type 1 hypervisor.

With a bare metal boot process, the computing device is initially powered on. The hardware of the computing device is configured to automatically start executing code in system firmware. The firmware performs preliminary hardware initialization operations, such as properly configuring the processors, caches, and memory subsystems of the computing device, for example. The firmware then proceeds to identify and initialize input/output devices, and finally, the firmware locates a boot device and performs a bootstrap operation. The software that is the subject of the bootstrap operation utilizes the firmware for a relatively short period of time to aid in its bootstrap operation. Usually this means that the bootstrapped software uses the firmware to load just enough of itself (device drivers and the like), to be able to become "self-sufficient" and no longer need the firmware. There are a very limited set of firmware services designed and provided for operation during the life of the bootstrapped software. One such firmware service is defined by the Advanced Configuration and Power Interface (ACPI) specification, for example.

In some situations, it may be necessary to bare metal boot a different hypervisor or operating system from the one that the computer system is presently running. For example, assume that at some point during the operation of the computer system, a system administrator, management application, or the like, determines that the computer system is to be re-purposed to perform other functions, provide other services, or the like. In order to bare metal boot a different hypervisor or operating system, the computer system must be cycled back through its firmware initialization phase (e.g., an initialization phase of a Basic Input/Output System (BIOS) layer, Unified Extensible Firmware Interface (UEFI) layer, and/or an Open Firmware layer) and bootstrap load the new control program, e.g., the new hypervisor or operating system. This takes a relatively large amount of time to accomplish. Moreover, such an operation requires the presence of firmware in order to accomplish this operation.

As recognized by the present inventors, it would be advantageous to be able to bare metal boot a control program without cycling back through the firmware reboot process, power cycle the computing device, or otherwise perform a control program restart operation. The illustrative embodiments described herein provide mechanisms for performing such a bare metal boot of a control program, e.g. hypervisor, operating system, virtual machine manager, or the like, without cycling back through the firmware reboot process, i.e. without using platform firmware such as BIOS, UEFI, Open Firmware, or the like. With the mechanisms of the illustrative embodiments, by providing mechanisms for performing a bare metal boot of a control program without resetting the computer system and rebooting through the platform firmware, repurposing times for the computer system are greatly improved and the ability to perform such functionality with computer systems that do not have such firmware is made possible, i.e. in a "firmware-free" computer platform environment.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
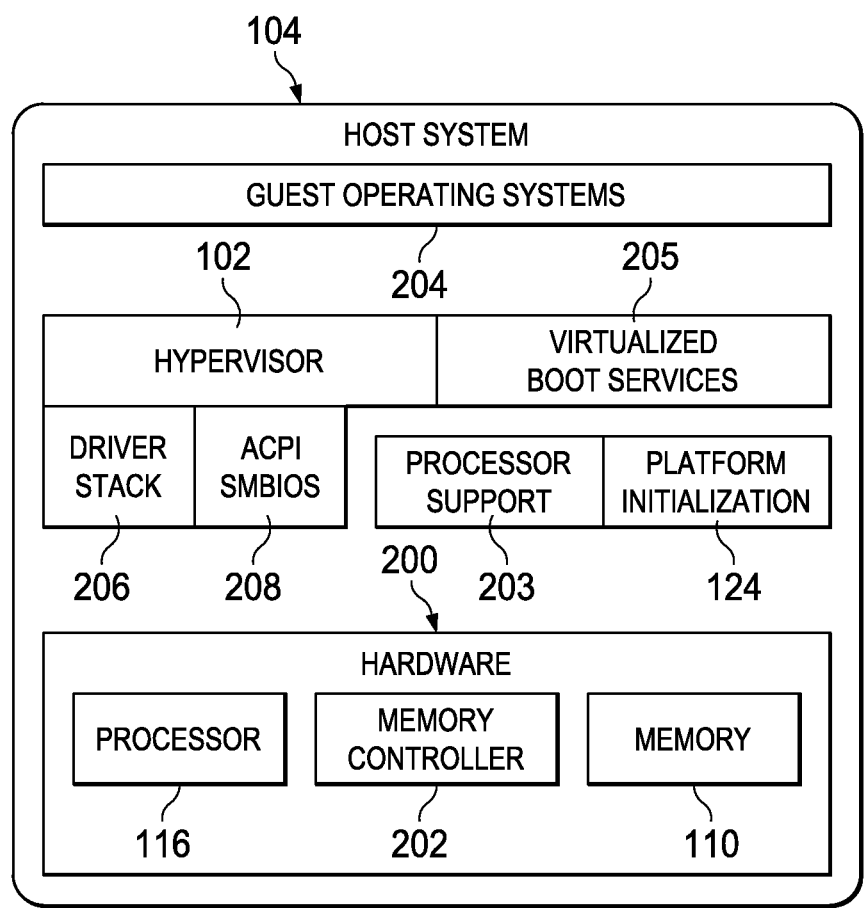
FIG. 2 illustrates a block diagram of the host system 104 in accordance with one or more embodiments of the present invention.

Thus, the illustrative embodiments may be utilized in many different types of data processing environments. Essentially, any computer system that uses bare metal booting of a control program, such as a hypervisor, operating system, or the like, may make use of the mechanisms of the illustrative embodiments described herein. For purposes of illustration, however, the present description will assume a computer system having a "firmware-free" computer platform environment, such as described in commonly owned and co-pending U.S. patent application Ser. No. 12/861,780, entitled "Methods and Systems for Enabling Control to a Hypervisor in a Cloud Computing Environment," filed Aug. 23, 2010. With this computer system, a host computer is configured to provide a cloud computing environment, as described hereafter with reference to FIGS. 1 and 2. It should be appreciated that the mechanisms of the illustrative embodiments are not limited to such, however, and can be used with any computer system as discussed above. FIGS. 1 and 2 are only examples and are not intended to be limiting on the scope of the illustrative embodiments or the present invention.

FIG. 1 illustrates a block diagram of a system 100 for enabling a hypervisor 102 to efficiently assume control in a cloud computing environment in accordance with embodiments of the present invention. Referring to FIG. 1, the system 100 may include a host system 104 implementing a cloud computing environment for one or more user systems 106. The host system 104 may be in communication with the user systems 106 over a network 108. In one or more embodiments, the host system 104 includes one or more servers each having one or more processors (e.g., a CPU) capable of reading and executing instructions, and handling requests from user systems 106 in a cloud computing environment. The host system 104 may run various applications, and may serve as an applications server, Web server, and/or a database server. The user systems 106 may be a desktop computer, a laptop computer, a general-purpose computer, a smartphone, or any other suitable computing device having an interface for communicating with the host system 104. Users can initiate various tasks on the host system 104 via the user systems 106, such as running application programs. While only a single host system 104 is shown in FIG. 1, it will be understood that multiple host systems can be implemented, each in communication with one another via direct coupling or via one or more networks. For example, multiple host systems may be interconnected through a distributed network architecture. The single host system 104 may also represent a cluster of hosts collectively performing processes as described in greater detail herein.

The network 108 may be any suitable type of communications network known to those of skill in the art. For example, the network 108 may be an intranet, extranet, or an internetwork, such as the Internet, or a combination thereof. The network 108 may include wireless, wired, fiber optic links, or other known or later developed communication links using any of a plethora of different communication protocols and devices for interconnecting computer systems.

The host system 104 may access and store data in memory 110. The memory 110 may be any suitable type of storage and may include a secondary storage element, e.g., hard disk drive, tape, or a storage subsystem that is internal or external to the host system 104. Types of data that may be stored in the memory 110 include, for example, log files and databases. It should be understood that the memory 110 is provided for purposes of simplification and ease of explanation and is not to be construed as limiting in scope. The memory 110 may be in the form of multiple memory devices utilized by the host system 104.

The host system 104 may execute various applications, including the hypervisor 102 and multiple virtual machines 112. The hypervisor 102 may manage access to computing resources of the host system 104 and may serve as a virtual machine monitor (VMM) to support concurrent operation of the multiple virtual machines 112 on the host system 104. Each virtual machine 112 can support specific guest operating systems and multiple user sessions for executing software written to target the guest operating systems. For example, one virtual machine 112 may support an instance of a particular operating system, while another virtual machine 112 executes an instance of another operating system. Any suitable type of operating system known by those of skill in the art can be supported by the hypervisor 102 through the virtual machines 112.

The computing resources of the host system 104 may include any suitable hardware, software, and/or firmware, and may include such hardware, software and/or firmware for enabling cloud computing service to be provided to the user systems 106. Some or all of these computing resources may be used to facilitate the operation of the host system 104 (e.g., booting or powering up of the host system) and for enabling service to the user systems 106 in the cloud computing environment. Exemplary computing resources include, but are not limited to, the memory 110, one or more input/output (I/O) bus modules 114, one or more processors 116, one or more 110 communication modules 117, a display adapter 118, a keyboard adapter 120, a mouse adapter 122, and the like. These computing resources and others residing on the host system 104, or accessible for use by the host system 104, may be used by the hypervisor 102 for enabling a user system 106 to operate an assigned virtual machine 112.

The I/O communication modules 117 may be configured for sending communications to and receiving communications from the network 108. For example, the I/O communication modules 117 may manage communication of messages between user systems 106 and the host system 104. Such messages may include, for example, information relating to cloud computing services provided by the host system 104 to the user systems 106, as will be understood by those of skill in the art.

In accordance with some illustrative embodiments, the host system 104 may include a platform initialization module

124. The platform initialization module 124 may be implemented by hardware, software, firmware, or combinations thereof for initializing the host system 104 to provide cloud computing services to one or more of the user systems 106. The platform initialization module 124 may be used for initializing computing resources of the host system 104 during boot up or power up in accordance with illustrative embodiments described herein.

A portion of the computing resources may be identified, apart from other computing resources, as having priority for initialization in response to boot or power up of the host system 104. This portion of the computing resources may be necessary for enabling service to user systems in the cloud computing environment. In response to boot up or power up of the host system 104, the platform initialization module 124 may initialize one or more of the identified computing resources for efficiently enabling service to user systems. The identified computing resources may be initialized in a predetermined order. The identified computing resources may include, but are not limited to, all or a portion of the memory 110, the I/O bus module 114, the processor 116, the display adapter 118, the keyboard adapter 120, the mouse adapter 122, various other computing resources, and the like. Other computing resources, such as, but not limited to, another portion of the memory 110, may be initialized subsequent or simultaneous with the enablement of services to the user systems 106.

FIG. 2 illustrates a block diagram of the host system 104 in accordance with one or more embodiments of the present invention. In this exemplary block diagram, reference is made to the host system 104 shown in FIG. 1 for purposes of illustration; however, reference to the example of FIG. 1 should not be construed as limiting. As depicted in FIG. 2, the host system 104 may include a plurality of layers and functions for providing use of the virtual machines 112 to the user systems 106 in the clouding computing environment. The host system 104 may include a hardware layer 200 having the processor (e.g., a CPU) 116, a memory controller 202, and the memory 110. The processor 116 may interact with the memory controller 202, which may control the writing and reading of data to and from the memory 110. The memory 110 may include multiple memory modules, each of which may include multiple storage devices, such as, but not limited to, random access memory (RAM) chips. The hardware layer 200 may also contain other suitable hardware, such as, but not limited to, communication channels, I/O ports, a clock, bus systems, and controllers. The processor 116 may be supported by a processor support module 203, which resides above the hardware layer 200.

The hypervisor 102 resides above the hardware layer 200 and supports the execution of virtual machines. For example, the hypervisor 102 may support the execution of guest operating systems 204 of the virtual machines. A virtualized boot services module 205 may provide booting functions and support for the guest operating systems 204. Further, the hypervisor 102 may be responsible for both sharing of hardware resources and the enforcement of control rules based on the available hardware resources. In this example, the hypervisor 102 is a Type 1 hypervisor, and thus runs in supervisor mode or privileged mode on "bare metal".

The host system 104 may include a driver stack 206 managed by the hypervisor 102 for controlling the operation of hardware resources. Further, the host system 104 may include platform firmware tables such as, but not limited to, advance configuration and power interface (ACPI) tables and system management basic input/output system (SMBIOS) tables 208.

As mentioned above, the illustrative embodiments provide mechanisms for performing a bare metal boot of a control program, such as a hypervisor, operating system, other type of virtual machine manager (VMM) or the like, without cycling back through the firmware reboot process. In particular, the hypervisor 102 in FIG. 1, or other control program, is augmented by the mechanisms of the illustrative embodiments to facilitate bare metal booting of another control program using one or more of a dynamic mode bare metal boot and/or a persistent mode bare metal boot.

With the dynamic mode bare metal boot, the hypervisor 102 is operating in a normal fashion, i.e. in a virtualized production environment, by hosting and managing a number of virtual machines. At some point during this normal operation, an administrator or management application determines that the computing device upon which the hypervisor 102 is executing needs to be repurposed so as to provide a different functionality, service, or the like, which requires a different control program to be executed. With this dynamic mode bare metal boot functionality, the hypervisor 102 comprises logic that is executed by the computing device to transition the hypervisor 102 to a mode to support the bare metal boot of another control program.

With the persistent mode bare metal boot, as the platform of the computing device initializes from a cold start or a restart, the hypervisor 102 comprises logic that loads the hypervisor 102 directly into a mode of operation that supports bare metal booting of another control program. In this mode of operation, the hypervisor 102 does not manage multiple virtual machines.

Whether operating in dynamic mode or persistent mode for bare metal boot, the hypervisor 102, or other control program, comprises logic for entering and performing a boot loader mode of operation that permits bootstrapping of a bare metal boot control program that is to be booted, as well as detection of actual hardware resources by the bootstrapped bare metal boot control program. The boot loader mode of operation of the hypervisor 102 causes the hypervisor 102 to emulate firmware services such that, rather than the control program that is being booted accessing firmware services from the system firmware itself, the firmware services are emulated by the hypervisor 102 and calls to the firmware services application program interface (API) are processed by the hypervisor 102 with input/output being performed by the hypervisor device drivers. Moreover, the boot loader mode of operation of the hypervisor 102 exposes the true characteristics of the underlying hardware platform of the computing device to the bare metal boot control program being booted such that the bare metal boot control program may load its corresponding device drivers.

Once the bootstrapped bare metal control program completes its detection of hardware devices, loading of device drivers, and calls to firmware services (which are intercepted and serviced by the hypervisor, hypervisor device drivers, and a firmware API mapper, as described in greater detail hereafter), the hypervisor 102 comprises logic for releasing control of the hardware platform of the computing device to the control program. The bootstrapped bare metal control program then completes its bootstrap operation via its own device driver stack via direct access to the physical hardware. As a result, the control of the hardware platform of the computing device is transitioned from being under the control of the original hypervisor 102 to being under the control of the bootstrapped bare metal control program which has direct access to the underlying hardware due to the bare metal boot of this bootstrapped bare metal control program. The operation of the primary elements of the illustrative embodiments will now be described in greater detail with reference to the figures.

Figure 3:
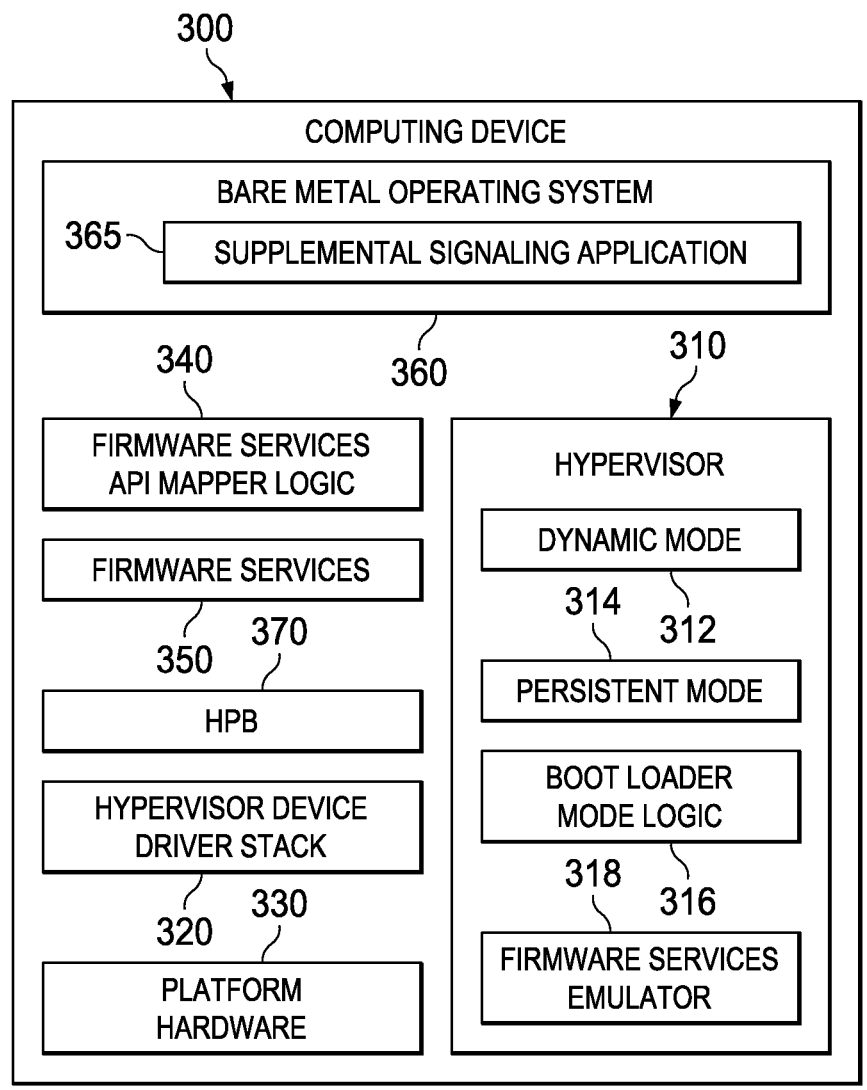
FIG. 3 is an example block diagram of the primary operational elements of computing device in accordance with one illustrative embodiment at an initial bootstrap phase of a bare metal control program.

FIG. 3 is an example block diagram of the primary operational elements of computing device in accordance with one illustrative embodiment at an initial bootstrap phase of a bare metal control program. In the depicted example, the bare metal control program is a bare metal operating system that is being bare metal booted via the hypervisor utilizing the mechanisms of the illustrative embodiments. This bare metal bootstrap booting of the bare metal operating system is accomplished without having to perform a software reset or cycle power to the computing device and reboot through the hardware platform firmware. This furthermore allows the hardware platform environment to be "firmware-free" in the sense that the BIOS, UEFI, or Open Firmware abstraction layer is not required to perform the bare metal boot of the subsequent control program.

As shown in FIG. 3, a hypervisor 310, a VMM, or other control program, and its associated device driver stack 320 are executing on platform hardware 330. The hypervisor 310 may be initialized and executed on the platform hardware 330 in a fashion generally known in the art. As shown in FIG. 3, the hypervisor 310 comprises dynamic mode bare metal boot logic 312, persistent mode bare metal boot logic 314, boot loader mode logic 316, and firmware emulator logic 318. The dynamic mode bare metal boot logic 312 operates to receive a request from an administrator or a management application, requesting the bare metal boot of another control program, which in the depicted example is bare metal operating system 360, and perform operations to dynamically place the hypervisor 310 into a boot loader mode after the hypervisor 310 is already executing and managing virtual machines executing on the computing device. The request may be received, for example, by an administrator or management application setting the state of a mode or option value in an interface or the like. The persistent mode bare metal boot logic 314 operates to initialize the hypervisor 310 into a boot loader mode when the hypervisor 310 is initially booted.

Thus, if the hypervisor 310 is operating in a "hypervisor mode," meaning that the hypervisor 310 is managing virtual machines (not shown) that are executing on the computing device, then in response to a request to bare metal boot another control program, the dynamic mode bare metal boot logic 310 operates to migrate or shut down the exiting workloads being executed by the virtual machines managed by the hypervisor 310. The actual migration and shutting down or exiting of workloads is performed in a manner generally known in the art. Once these workloads are shut down or migrated, the dynamic mode bare metal boot logic 312 signals the hypervisor 310 to enter a boot loader mode of operation which will cause the boot loader mode logic 316 of the hypervisor 310 to handle initial bare metal booting of the bare metal operating system 360 as described hereafter. The signaling of the hypervisor 310 to enter a boot loader mode of operation may be performed using an administrative-level Hypervisor API call, for example.

On the other hand, if the hypervisor 310 is to be initialized into a boot loader mode of operation when it is initially booted, i.e. in response to power-on of the computing device or resetting of the computing device, then the persistent mode bare metal boot logic 314 checks to see if a boot pass-through mode configuration structure indicates that the hypervisor 310 should be booted to a boot loader mode of operation or not. The boot pass-through mode configuration structure may be stored, for example, in a system configuration non-volatile RAM or similar memory. In response to the boot pass-through mode configuration structure indicating that the hypervisor is to be booted into a boot loader mode of operation, the persistent mode bare metal boot logic 314 signals the hypervisor 310 to enter the boot loader mode of operation. Otherwise, the hypervisor is booted into a "hypervisor mode" of operation such that dynamic mode bare metal booting may be performed at a later time.

As can be seen from the above, regardless of whether dynamic or persistent mode bare metal boot is performed, the hypervisor 310 is placed into a boot loader mode of operation which causes the boot loader mode logic 316 to handle initial bare metal booting of another control program, such as bare metal operating system 360. During the boot loader mode of operation, the boot loader mode logic 316 configures the computing device to allow the bare metal operating system 360 to detect the actual platform hardware 330 and load its own device driver stack corresponding to the detected platform hardware 330. The boot loader mode logic 316 permits this detection by way of setting a hypervisor present bit (HPB) 370 of the computing device to indicate that a hypervisor is not present. Guest control programs, such as bare metal operating system 360, may test the state of the hypervisor present bit 370 to determine if calls by the guest control program should be made to the hypervisor 310 or directly to the platform hardware 330 via the firmware services 340 and the guest operating system's own device driver stack. The hypervisor 310, when in hypervisor mode, would set this hypervisor present bit 370 to indicate that the hypervisor 310 is present and thus, the guest operating system is loaded as a virtual machine managed by the hypervisor 310. However, during boot loader mode, the boot loader mode logic 316 sets, or resets, the state of the hypervisor present bit 370 to indicate that the hypervisor 310 is not present.

Thus, when the bootstrap operation of the bare metal operating system 360 is initiated, the bare metal operating system 360 reads the state of the hypervisor present bit 370 and determines that it is not being loaded in a virtual machine but instead is performing a bare metal boot of itself. As a result, the bare metal operating system 360 submits firmware service application program interface (API) calls to firmware services of the computing device to perform operations for booting the bare metal operating system 360. Examples of such firmware services include, for example, a call to BIOS Interrupt 13 (hex) to obtain disk services such as read disk block(s), a call to ask for a map of the system address space and associated RAM areas, and the like. With the mechanisms of the illustrative embodiments, however, a firmware API mapper logic 340 is provided, either as a separate component or as part of the hypervisor 310, for example, that maps the firmware service API calls from the bare metal operating system 360 to emulated firmware services provided by the firmware emulator 318 of the hypervisor 310 such that the hypervisor 310 "traps" the firmware service API calls from the bare metal operating system 360. Any input/output operations that are necessary to perform the bootstrap operation for booting the bare metal operating system 360, as a consequence of the firmware services API calls from the bare metal operating system 360 which are intercepted by the hypervisor 310, are performed by the hypervisor device drivers in the hypervisor device driver stack 320.

That is, the hypervisor 310 provides a virtual hardware platform to the abstraction layer above the hypervisor 310. As part of the virtual hardware platform, the hypervisor 310 may provide a virtual BIOS layer. The hypervisor 310 services BIOS calls, not through a firmware BIOS, but through its own device driver stack. In the case of bare-metal boot operations of the illustrative embodiments, the hypervisor 310 may trap a firmware service call, such as the BIOS disk read call in the example described before, and provide a true set of actions for the firmware service call. That is, a BIOS disk call in this illustrative embodiment does not read from an actual disk directly, rather it reads the corresponding block in a file where that file represents a physical disk to the virtual machine.

Hence, rather than having to access the firmware services 350 in the firmware itself, which may or may not actually be present in the computing device depending upon whether or not the computing device is a firmware free computing device or not, the already booted hypervisor 310 services the firmware service API calls using the emulated firmware services 318. That is, while the bare metal operating system 360 believes it is communicating with the firmware services 340 to perform operations for booting the bare metal operating system 360, the firmware services API calls from the bare metal operating system 360 are instead being serviced by the emulated firmware services 318 of the hypervisor 310.

It should be noted that the hypervisor 310 and its associated data structures, such as the global descriptor table, interrupt descriptor table, and the like, are in upper memory and isolated from the bare metal operating system 360. That is, while the hypervisor 310 is providing bare metal boot services, it must protect itself from the control program that is being bare metal booted. To be able to operate, the hypervisor 310 must still own some of the fundamental hardware components, at least for a short while. Thus, the hypervisor 310 and its data structures are present in "upper memory" since it is traditionally easier to mislead a control program by saying there is slightly less overall system RAM than there actually is, i.e. let the control program believe that the "upper memory" is not even present and thus, cannot be accessed by the control program. This ensures that key areas of the overall system memory map look are not reconfigured by the control program. Thus, the "upper memory" in this example, refers to a small slice of address space off the top of the system RAM memory map which can be kept unmodified by the control program that is being bare metal booted. Of course, other mechanisms that preserve the hypervisor 310 and its data structures may be used without departing from the spirit and scope of the illustrative embodiments.

The bootstrap operation for booting the bare metal operating system 360 continues with the bare metal operating system 360 executing operations to detect the underlying platform hardware 330 and making firmware service API calls to firmware services that are instead mapped, by the firmware API mapper logic 340, to emulated firmware services 318 in the hypervisor 310. This process continues so as to boot the key components of the bare metal operating system 360 such that enough of the operating system is loaded to be able to abandon the firmware service APIs and continue the bootstrap operation using bare metal operating system native components and drivers. For example, in a Microsoft Windows™ operating system, when Microsoft Windows™ starts to boot, it makes a number of disk read requests to the BIOS to loads its "core" driver set. Clearly one of the core drivers is the disk driver for the disk it is booting from. Once drivers such as these are in memory, Microsoft Windows™ stops using the BIOS and starts using its own driver stack. In another example, the UEFI has a specific firmware call that the control program makes that essentially states "I am done with the firmware."

It should be noted that during this initial phase of operation in which the bare metal operating system 360 detects the underlying platform hardware resources 360, e.g., memories, registers, processors, buses, etc., and makes firmware services API calls that are serviced by the hypervisor 310, the hypervisor 310 in essence "owns" the hardware platform 330 and controls/manages the hardware platform resources 330. While the hypervisor 310 is interposed between the hardware platform 330 and the control program being bare metal booted, i.e. the bare metal operating system 360, the hypervisor 310 allows the control program to "see" the hardware platform 330 as it really is, yet still remains operational to complete the transitional phase. To remain operational, the hypervisor 310 allows the control program to think it is managing key resources, such as hardware-level interrupts, yet in fact the hypervisor 310 still controls/manages them. Basically, during this phase of the bare metal boot operation, the hypervisor 310 represents key hardware components, such as interrupts, by their true physical characteristics yet keeps them virtualized so as to remain in control of, or "own," the hardware platform 310 overall. Thus, this phase is referred to as the hypervisor ownership phase of the bare metal boot operation.

Once the bare metal operating system 360 loads sufficient components to be able to abandon the firmware service APIs, the bare metal operating system 360 progresses to a transition phase in which the hypervisor 310 releases its control, or ownership, of the hardware platform 330. The releasing of the control/ownership of the hardware platform 330 comprises the hypervisor 310 ceasing its handling of firmware service API calls via the firmware API mapper logic 340, such as by a natural transition from using firmware service API calls to handling operations using the hypervisor's native stack. In addition, the hypervisor 310 configures the hardware platform resources 330 so that they are configured for usage by the bare metal operating system 360. This may involve setting all of the control registers of the computing device to values set by the bare metal control program and thereby remove the hypervisor 310 from control of the corresponding hardware platform resources 330. For example, the hypervisor 310 may take the virtual state of the remaining devices (such as interrupts described earlier) and may update the corresponding physical hardware to match the remaining devices.

Once the transition from the hardware platform 330 being under the control and management of the hypervisor 310 to the control and management by the bare metal operating system 360 is completed, the operating system 360 may signal this completion to the hypervisor 310. This signaling may be, for example, via an API call (such as in the case of UEFI boot code) or a transition from a processor real mode to a processor protected mode (such as in the case of BIOS boot code), for example. In one illustrative embodiment, an optional supplemental software component 365 may be loaded on the bare metal operating system 360 to signal back to the hypervisor 310 that the transition of the control of the hardware platform 330 from the hypervisor 310 to the bare metal operating system 360 has completed.

In addition, during the transition phase of the bare metal boot operation, after releasing control of the hardware platform 330 and signaling completion of the transition from the hypervisor 310 to the bare metal operating system 360, the hypervisor 310 may be pared down to a hypervisor stub that remains active to service a small set of runtime firmware API calls. For example, the hypervisor 310, during the transition phase, learns the addresses of the runtime routines via firmware service API calls. These addresses may be maintained by the hypervisor stub and used to service a small set of control program firmware calls that may still be made during runtime, such as those described in the ACPI specification. The firmware API mapping logic 340 may also be discarded and no longer utilized. The hypervisor 310 may pare itself down by representing the hypervisor 310 memory areas that are no longer being used as "free." To notify the control program, e.g., bare metal boot operating system 360, which is now up and running, that there is "more memory," a "hot add" event may be generated. The control program may respond to this hot add event by recognizing the hot add event and incorporating the new memory regions into its own memory pool.

At this point during the bare metal boot operation, the bare metal operating system 360, i.e. the new bare metal booted control program, is in control and manages the platform hardware 330. Thus, this phase of the bare metal boot operation following the transition phase is referred to as the control program ownership phase, where in the depicted example, the control program is the bare metal operating system 360. During this phase of the bare metal boot operation, the bare metal operating system 360 completes its bootstrap operation via its own device driver stack via direct access to the physical hardware of the hardware platform 330. That is, the device driver stack was built by the bare metal operating system 360 during the hypervisor ownership phase via detection of the actual underlying platform hardware 330 and loading of the corresponding device drivers by the bare metal operating system 360. This device driver stack is now utilized by the bare metal operating system 360 to complete its bootstrap operation, such as by performing disk reads, disk writes, performing networking operations, initializing video and audio output, and the like. Once the bare metal operating system 360 completes its bootstrap operation via its own device driver stack, the bare metal operating system 360 is in control of the platform hardware 330 and is ready to handle workloads, such as workloads from executed applications or the like.

Figure 4:
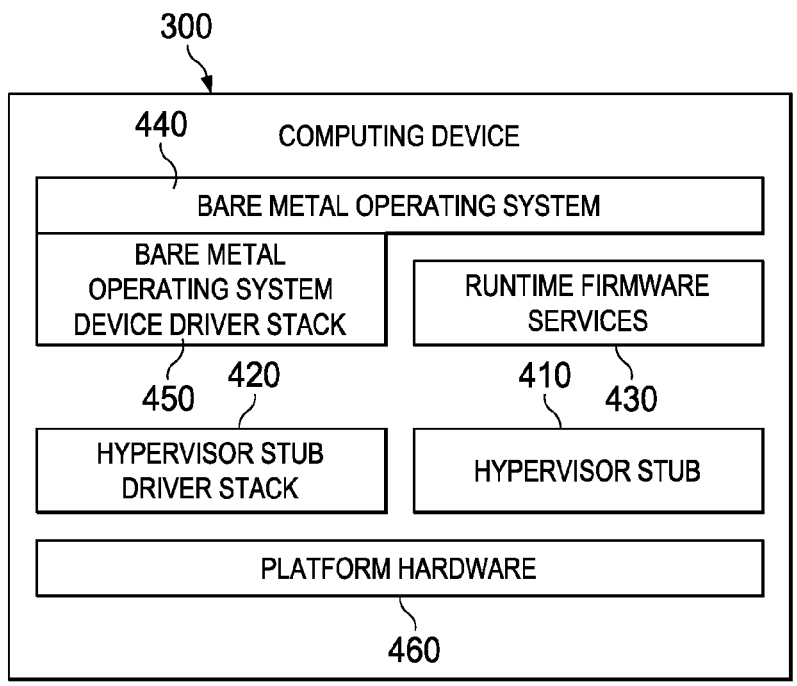
FIG. 4 is an example block diagram of the primary operational elements of a computing device in accordance with one illustrative embodiment during runtime operation after performing a bare metal boot operation for booting a bare metal control program.

FIG. 4 is an example block diagram of the primary operational elements of a computing device in accordance with one illustrative embodiment during runtime operation after performing a bare metal boot operation for booting a bare metal control program. As shown in FIG. 4, when compared to FIG. 3, the hypervisor 310 is reduced to a hypervisor stub 410 and its associated hypervisor stub driver stack 420. The firmware services 430 are minimized and are utilized by the hypervisor stub 410 to service a small number of firmware calls by the bare metal operating system 440. The bare metal operating system 440 is able to communicate and operate with the platform hardware 460 directly via the bare metal operating system driver stack 450 without having to make calls to the hypervisor 310 or the hypervisor stub 410. Thus, the hypervisor stub 410, with the exception of a small number of firmware API calls that may still be handled by the hypervisor stub 410, is essentially not utilized by the bare metal operating system 440 to execute workloads on the platform hardware 460.

Thus, with the mechanisms of the illustrative embodiments, by providing mechanisms for performing a bare metal boot of a control program without resetting the computing device, i.e. cycling the power to the computing device, and rebooting through the platform firmware, repurposing times for the computing device are greatly improved. The mechanisms of the illustrative embodiments provide functionality for transitioning from a hypervisor ownership phase of a boot operation in which a hypervisor is in control of, and manages, the hardware platform, to a control program ownership phase in which control and management of the hardware platform is handed off from the hypervisor to a bare metal booted control program, e.g., another operating system, hypervisor, or other type of control program. Since this bare metal boot operation is performed using emulated firmware service APIs in the hypervisor rather than using firmware service APIs provided by firmware itself, the mechanisms of the illustrative embodiments further provide the ability to perform a bare metal boot operation with computing devices that do not have such firmware, i.e. "firmware-free" computer platform environments.

Figure 5:
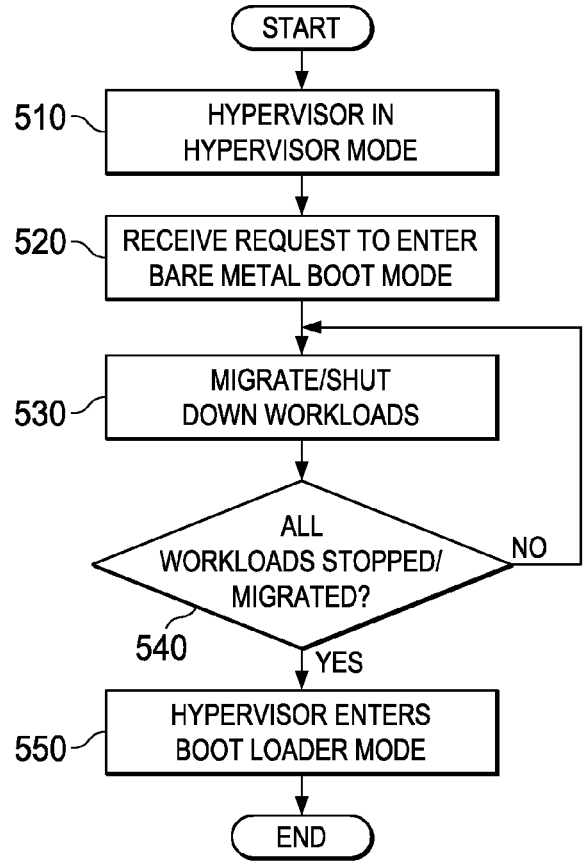
FIG. 5 is a flowchart that outlines an example operation for performing a dynamic transition to a boot loader mode in accordance with one illustrative embodiment.
Figure 6:
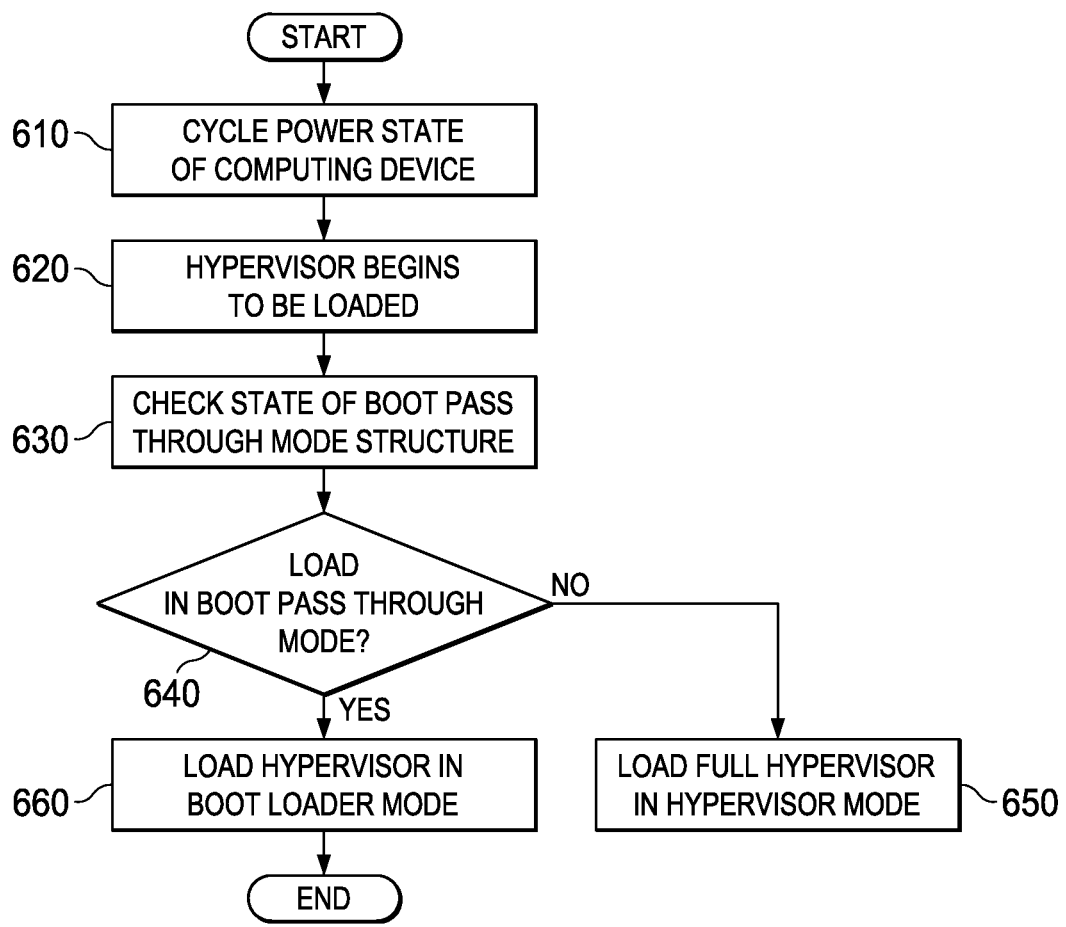
FIG. 6 is a flowchart that outlines an example operation for performing a persistent transition to a boot loader mode in accordance with one illustrative embodiment.
Figure 7:
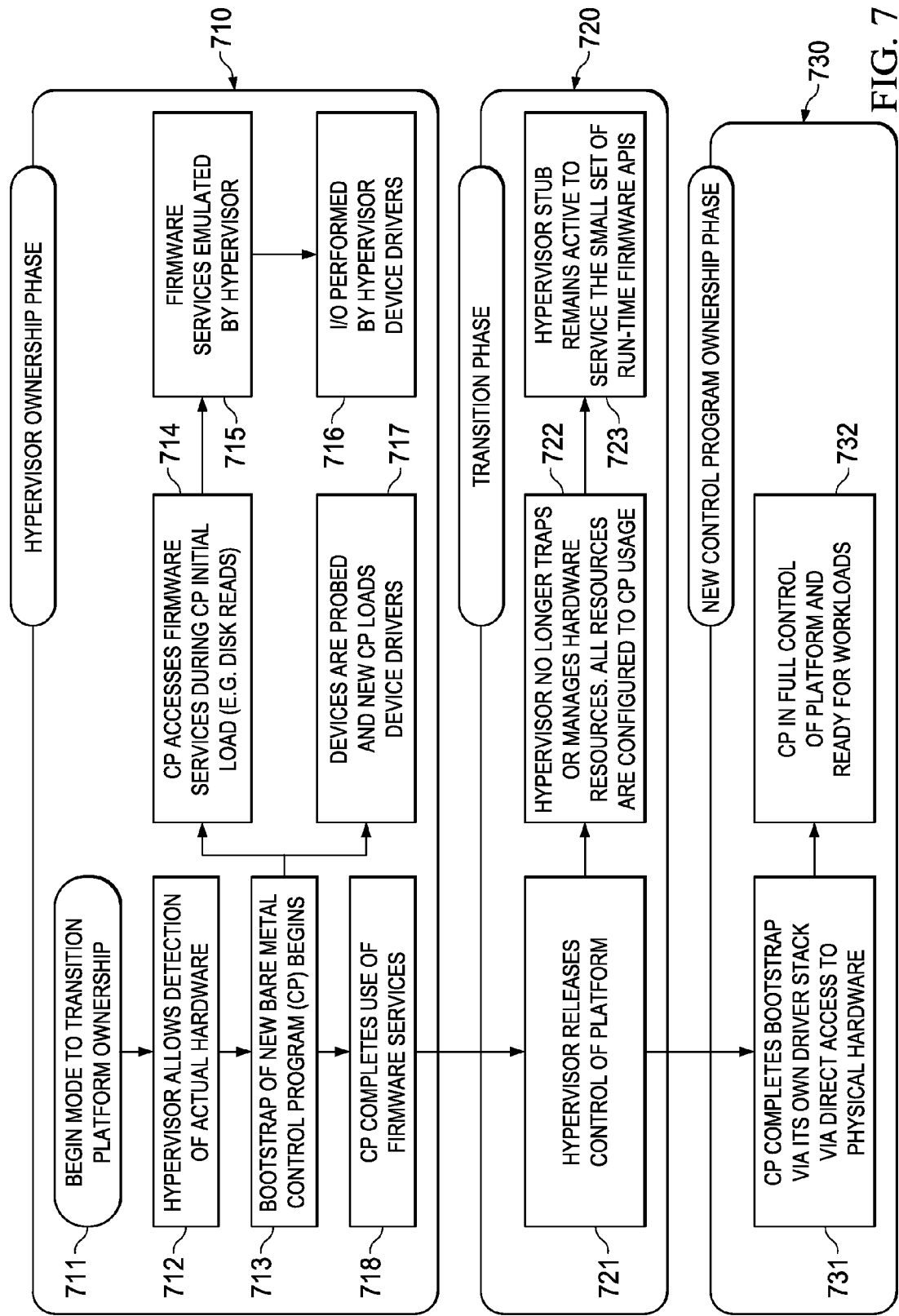
FIG. 7 is a flowchart that outlines an example operation of a boot loader mode of operation in accordance with one illustrative embodiment.

To further illustrate the bare metal boot operation, and to summarize the details described above, reference is now made to FIGS. 5-7 which outline example operations of the primary elements of a computing device during a bare metal boot operation in accordance with one illustrative embodiment. FIG. 5 is a flowchart that outlines an example operation for performing a dynamic transition to a boot loader mode in accordance with one illustrative embodiment. FIG. 6 is a flowchart that outlines an example operation for performing a persistent transition to a boot loader mode in accordance with one illustrative embodiment. FIG. 7 is a flowchart that outlines an example operation of a boot loader mode of operation in accordance with one illustrative embodiment.

With reference now to FIG. 5, the operation outlined in FIG. 5 may be implemented, for example, by the dynamic mode logic 312 of the hypervisor 310 in FIG. 3, for example, during an initial phase of a bare metal boot operation for entering into a boot loader mode of operation such that bare metal booting of a control program may be facilitated. As shown in FIG. 5, the dynamic mode starts with the hypervisor running in a hypervisor mode where the hypervisor is managing one or more virtual machines executing on the computing device (step 510). A request is received in the hypervisor for causing the hypervisor to enter a bare metal boot mode of operation to bare metal boot another control program (step 520). As mentioned above, the request may be received from a system administrator, a management application, or the like.

In response to receiving the request, the hypervisor controls the virtual machines that it manages to migrate or shut down the workloads being executed by the virtual machines (step 530). A determination is made as to whether all of the existing workloads have been migrated or shut down (step 540). If not, the operation returns to step 530 until all of the workloads are migrated or shut down. If all of the workloads are migrated or shut down, the hypervisor enters a boot loader mode of operation which handles the bare metal booting of another control program in accordance with the illustrative embodiments (step 550). The operation then ends.

With regard to FIG. 6, the operation outlined in FIG. 6 may be implemented, for example, by the persistent mode logic 314 of the hypervisor 310 in FIG. 3, for example, during an initial phase of a bare metal boot operation for entering into a boot loader mode of operation such that bare metal booting of a control program may be facilitated. As shown in FIG. 6, the dynamic mode starts with the cycling of the power state of the computing device, e.g., a power on or reset of the computing device (step 610). In response to the power cycling, the hypervisor begins to load in the computing device (step 620). A boot pass through mode structure is checked to see if the hypervisor is to be loaded in a boot pass through mode where the hypervisor is configured to perform a bare metal boot of another control program (step 630). If the boot pass through mode structure has a state that indicates that the hypervisor is not to be loaded in a boot pass through mode (step 640), then the full hypervisor is loaded in hypervisor mode (step 650). If the boot pass through mode structure has a state that indicates that the hypervisor is to be loaded in a boot pass through mode (step 640), then the hypervisor is loaded in a boot loader mode of operation which handles the bare metal booting of another control program in accordance with the illustrative embodiments (step 660). The operation then terminates.

Whether or not the dynamic or persistent mode of the hypervisor is followed to enter the boot loader mode of operation in the hypervisor, the boot loader mode of operation is used to perform bare metal booting of another control program without power cycling or cycling through the firmware initialization. FIG. 7 is a flowchart that outlines an operation of the boot loader mode of operation in which a bare metal boot operation is performed using three phases of operation, a hypervisor ownership phase, a transition phase, and a control program ownership phase.

As shown in FIG. 7, a hypervisor ownership phase 710 starts with the entry into the boot loader mode of operation of the hypervisor which involves using the boot loader mode logic to transition platform ownership from the hypervisor to the bare metal control program being bare metal booted (step 711). During this phase 710, the hypervisor allows the bare metal control program to detect the actual underlying hardware resources of the hardware platform (step 712). The new bare metal control program begins its bootstrap operation (step 713) which involves the sub-operations 714-717.

As shown, these sub-operations include the control program attempting to access firmware services during its initial loading (e.g., disk reads and the like) by making firmware service API calls that the control program believes are being serviced by the firmware of the computing device (step 714). However, these firmware service API calls from the control program are mapped, by a firmware service API mapper logic mechanism, to firmware services emulated by the hypervisor (step 715). The emulated firmware services of the hypervisor may perform input/output operations using hypervisor device drivers to implement the operations requested by the firmware service API calls from the control program (step 716). In addition, the control program may probe the hardware resources/devices and may load corresponding device drivers into a control program device driver stack (step 717).

At some point during the hypervisor ownership phase 710, the control program completes its use of firmware services (step 718) at which point the bare metal boot operation enters the transition phase 720. During the transition phase 720, the hypervisor releases its control of the hardware platform (step 721). As shown in FIG. 7, the transition phase 720 comprises the sub-operation of the hypervisor ceasing receiving firmware service API calls via the firmware service API mapper logic and further ceases management of the hardware resources. In addition, the hardware resources are configured for direct usage by the control program (step 722). The full hypervisor may be removed from memory and may be replaced with a hypervisor stub, i.e. a very small and limited functionality application, which remains active to service a small set of runtime firmware service API calls (step 723).

Once the hypervisor releases control of the hardware platform (step 721), the bare metal boot operation transitions to a new control program ownership phase 730 in which the new bare metal booted control program completes its bootstrap operation via its own device driver stack that was built during the hypervisor ownership phase 710 (step 731). The control program thus, has direct access to the physical hardware platform resources. When the control program completes its bootstrap operation, the control program is in full control of the hardware platform and ready to execute workloads (step 732). The operation then terminates.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a computing device comprising a processor and a memory, for executing a bare metal boot operation for bare metal booting a control program, comprising:
    booting the computing device to a hypervisor ownership phase of the bare metal boot operation, wherein during the hypervisor ownership phase of the bare metal boot operation a hypervisor is loaded and controls and manages platform hardware of the computing device;
    booting the computing device, from the hypervisor ownership phase of the bare metal boot operation, to a transition phase of the bare metal boot operation in which the hypervisor releases control and management of the platform hardware of the computing device to the control program; and
    booting the computing device from the transition phase to a control program ownership phase of the bare metal boot operation in which the control program is in full control and manages the platform hardware, wherein the bare metal boot operation is performed without restarting the computing device.

2. The method of claim 1, wherein the control program is one of an operating system, a different hypervisor, or a different virtual machine manager.

3. The method of claim 1, further comprising:
    performing, during the hypervisor ownership phase of the bare metal boot operation, a bootstrap execution of the control program using the hypervisor, wherein the hypervisor provides the control program access to a hardware platform of the computing device such that the control program probes devices of the hardware platform and loads corresponding device drivers into a control program device driver stack.

4. The method of claim 3, further comprising, during the hypervisor ownership phase of the bare metal boot operation:

trapping, by the hypervisor, firmware calls from the control program to firmware of the computing device; and servicing, by the hypervisor, the firmware calls using emulated firmware services provided by the hypervisor.

5. The method of claim 4, wherein trapping firmware calls comprises redirecting firmware calls to the emulated firmware services of the hypervisor using firmware mapper logic that maps the firmware calls to a corresponding emulated firmware service of the hypervisor for handling the firmware call.

6. The method of claim 4, wherein servicing the firmware calls using the emulated firmware services comprises using a hypervisor device driver stack to perform operations on a hardware platform of the computing device in order to service the firmware calls.

7. The method of claim 4, wherein booting the computing device, from the hypervisor ownership phase of the bare metal boot operation, to a transition phase of the bare metal boot operation comprises:

discontinuing, by the hypervisor, trapping of firmware calls from the control program;

reconfiguring hardware resources of the hardware platform for direct usage by the control program; and paring down the hypervisor to a hypervisor stub that provides logic for servicing a sub-set of runtime firmware application program interface calls.

8. The method of claim 3, wherein booting the computing device from the transition phase to a control program ownership phase comprises enabling the control program to perform operations directly with the hardware platform of the computing device using the control program device driver stack.

9. The method of claim 1, further comprising:

booting the hypervisor to a boot loader mode of operation in which, in response to a request to bare metal boot the control program, the hypervisor performs the bare metal boot operation by booting of the computing device via the hypervisor ownership phase, transition phase, and control program ownership phase.

10. The method of claim 9, wherein booting the hypervisor to the boot loader mode of operation comprises dynamically transitioning the hypervisor to the boot loader mode of operation after the hypervisor is already running in the computing device, or performing a persistent booting of the hypervisor to the boot loader mode of operation in which the hypervisor is initially executed on the computing device in the boot loader mode of operation.

11. A computer program product comprising a non-transitory computer readable medium having a computer readable program stored therein, wherein the computer readable program, when executed on a computing device, causes the computing device to:

boot the computing device to a hypervisor ownership phase of a bare metal boot operation, wherein during the hypervisor ownership phase of the bare metal boot operation a hypervisor is loaded and controls and manages platform hardware of the computing device;

boot the computing device, from the hypervisor ownership phase of the bare metal boot operation, to a transition phase of the bare metal boot operation in which the hypervisor releases control and management of the platform hardware of the computing device to the control program; and boot the computing device from the transition phase to a control program ownership phase of the bare metal boot operation in which the control program is in full control and manages the platform hardware, wherein the bare metal boot operation is performed without restarting the computing device.

12. The computer program product of claim 11, wherein the control program is one of an operating system, a different hypervisor, or a different virtual machine manager.

13. The computer program product of claim 11, wherein the computer readable program further causes the computing device to:

perform, during the hypervisor ownership phase of the bare metal boot operation, a bootstrap execution of the control program using the hypervisor, wherein the hypervisor provides the control program access to a hardware platform of the computing device such that the control program probes devices of the hardware platform and loads corresponding device drivers into a control program device driver stack.

14. The computer program product of claim 13, wherein the computer readable program, during the hypervisor ownership phase of the bare metal boot operation, further causes the computing device to:

trap, by the hypervisor, firmware calls from the control program to firmware of the computing device; and service, by the hypervisor, the firmware calls using emulated firmware services provided by the hypervisor.

15. The computer program product of claim 14, wherein trapping firmware calls comprises redirecting firmware calls to the emulated firmware services of the hypervisor using firmware mapper logic that maps the firmware calls to a corresponding emulated firmware service of the hypervisor for handling the firmware call.

16. The computer program product of claim 14, wherein servicing the firmware calls using the emulated firmware services comprises using a hypervisor device driver stack to perform operations on a hardware platform of the computing device in order to service the firmware calls.

17. The computer program product of claim 14, wherein the computer readable program further causes the computing device to boot the computing device, from the hypervisor ownership phase of the bare metal boot operation, to a transition phase of the bare metal boot operation by:

discontinuing, by the hypervisor, trapping of firmware calls from the control program;

reconfiguring hardware resources of the hardware platform for direct usage by the control program; and paring down the hypervisor to a hypervisor stub that provides logic for servicing a sub-set of runtime firmware application program interface calls.

18. The computer program product of claim 13, wherein the computer readable program further causes the computing device to boot the computing device from the transition phase to a control program ownership phase by enabling the control program to perform operations directly with the hardware platform of the computing device using the control program device driver stack.

19. The computer program product of claim 11, wherein the computer readable program further causes the computing device to:

boot the hypervisor to a boot loader mode of operation in which, in response to a request to bare metal boot the control program, the hypervisor performs the bare metal boot operation by booting of the computing device via the hypervisor ownership phase, transition phase, and control program ownership phase.

20. The computer program product of claim 19, wherein booting the hypervisor to the boot loader mode of operation comprises dynamically transitioning the hypervisor to the boot loader mode of operation after the hypervisor is already running in the computing device, or performing a persistent booting of the hypervisor to the boot loader mode of operation in which the hypervisor is initially executed on the computing device in the boot loader mode of operation.

21. A computing device, comprising:
   a processor; and
   a memory coupled to the processor, wherein the memory comprises instructions which, when executed by the processor, cause the processor to:
   boot the computing device to a hypervisor ownership phase of the bare metal boot operation, wherein during the hypervisor ownership phase of the bare metal boot operation a hypervisor is loaded and controls and manages platform hardware of the computing device;
   boot the computing device, from the hypervisor ownership phase of the bare metal boot operation, to a transition phase of the bare metal boot operation in which the hypervisor releases control and management of the platform hardware of the computing device to the control program; and
   boot the computing device from the transition phase to a control program ownership phase of the bare metal boot operation in which the control program is in full control and manages the platform hardware, wherein the bare metal boot operation is performed without restarting the computing device.

22. The computing device of claim 21, wherein the control program is one of an operating system, a different hypervisor, or a different virtual machine manager.

23. The computing device of claim 21, wherein the instructions further cause the processor to:
   perform, during the hypervisor ownership phase of the bare metal boot operation, a bootstrap execution of the control program using the hypervisor, wherein the hypervisor provides the control program access to a hardware platform of the computing device such that the control program probes devices of the hardware platform and loads corresponding device drivers into a control program device driver stack.

24. The computing device of claim 23, wherein the instructions, during the hypervisor ownership phase of the bare metal boot operation, further cause the processor to:
   trap, by the hypervisor, firmware calls from the control program to firmware of the computing device; and
   service, by the hypervisor, the firmware calls using emulated firmware services provided by the hypervisor.

25. The computing device of claim 24, wherein trapping firmware calls comprises redirecting firmware calls to the emulated firmware services of the hypervisor using firmware mapper logic that maps the firmware calls to a corresponding emulated firmware service of the hypervisor for handling the firmware call.

* * * * *